(12) United States Patent
Schultz et al.

(10) Patent No.: US 9,380,047 B2
(45) Date of Patent: Jun. 28, 2016

(54) INSECURE CONNECTION PROHIBITION

(71) Applicants: Jason C. Schultz, Roseville, MN (US);
James R. Heit, Roseville, MN (US);
Robert L. Bergerson, Roseville, MN (US)

(72) Inventors: Jason C. Schultz, Roseville, MN (US);
James R. Heit, Roseville, MN (US);
Robert L. Bergerson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 8 days.

(21) Appl. No.: 13/921,297

(22) Filed: Jun. 19, 2013

(65) Prior Publication Data

US 2014/0380421 A1      Dec. 25, 2014

(51) Int. Cl.
*H04L 29/06* (2006.01)
*H04L 29/08* (2006.01)

(52) U.S. Cl.
CPC .......... *H04L 63/0823* (2013.01); *H04L 67/141* (2013.01); *H04L 63/164* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,840,514 B2* | 11/2010 | Keith, Jr. | ............. | H04L 63/0272 706/47 |
| 8,094,812 B1* | 1/2012 | Tsang | ................... | H04L 9/3226 380/28 |
| 8,438,288 B2* | 5/2013 | Garcia Jurado Suarez | .................... | G06F 21/42 709/203 |
| 9,231,951 B2* | 1/2016 | Roskind | .................. | H04L 63/10 |
| 2007/0180225 A1* | 8/2007 | Schmidt | .................. | H04L 9/321 713/152 |
| 2009/0113528 A1* | 4/2009 | Ananda et al. | .................... | 726/5 |
| 2013/0246629 A1* | 9/2013 | Shao | ................... | H04L 63/0272 709/227 |

* cited by examiner

*Primary Examiner* — Beemnet Dada
(74) *Attorney, Agent, or Firm* — Richard J. Gregson

(57) ABSTRACT

A server system may be configured to receive a request for a connection from a client application. The server system may also be configured to determine if the client application is permitted to connect with the server. The connection with the client application may be prohibited if the server determines that the client application is not permitted to connect with the server. A secure connection with the client application may be permitted if the server determines that the client application is permitted to connect with the server. The secure connection may be established with the security protocol settings specified by a process on the server or shared security protocol settings specified by on a server system-wide basis.

21 Claims, 5 Drawing Sheets

INSECURE CONNECTION PROHIBITION

FIELD OF DISCLOSURE

The instant disclosure relates to computer networks. More specifically, this disclosure relates to securing computer network connections and prohibiting insecure connections to the computer networks.

BACKGROUND

Data is frequently transferred over public networks, in which other users of the network have access to the transferred data. These public networks have become ubiquitous with the explosion of Internet-enabled devices. However, data transferred over public networks may often be sensitive data not intended for viewing by a user other than the recipient. Furthermore, the user may specifically desire to prevent other users from viewing the data or to prevent insecure access to the data. Thus, secure connections may be created over the public networks. The secure connections may encrypt the data to ensure that only the intended recipient may view the data. Secure connections may be established through a secure sockets layer/transport layer security (SSL/TLS) protocol.

SUMMARY

The security protocol settings to be used for a secure connection between a server and a client may be indicated by an SSL/TLS handshake between a client application and the server, and different security protocol settings may be used to establish secure connections between the server and different client applications. That is, although the same security protocol settings may be applied to a plurality of client applications, the same security protocol settings need not be applied to all client applications. Therefore, certificate-validated client applications that cannot use secure connections can still communicate with a server system. However, client applications not certificate-validated can be prohibited from connecting to the network. The security protocol settings for the secure connection may be specified by a process on the server or the security protocol settings may be specified on a system-wide basis.

According to one embodiment, a method may include receiving, by a server, a request for a connection from a client application. The method may include determining, by the server, if the client application is permitted to connect with the server. The method may also include permitting, by the server, a secure connection with the client application if the server determines that the client application is permitted to connect with the server. The method may further include prohibiting, by the server, the connection with the client application if the server determines that the client application is not permitted to connect with the server. The secure connection may be established with the security protocol settings specified on a system wide basis, or the secure connection may be established based on security protocol settings specified by a process on the server, allowing for different security protocol settings for different clients or groups of clients.

According to another embodiment, a computer program product may include a non-transitory computer readable medium comprising code to perform the steps of receiving a request for a connection from a client application, and determining if the client application is permitted to connect with a server. The medium may also include code to perform the step of permitting a secure connection with the client application if the client application is determined to be permitted to connect with the server. The medium may further include code to perform the step of prohibiting the connection with the client application if the client application is determined to not be permitted to connect with the server.

According to a further embodiment, an apparatus may include a memory, and a processor coupled to the memory. The processor may be configured to execute the steps of receiving a request for a connection from a client application, and determining if the client application is permitted to connect with a server. The processor may also be configured to execute the step of permitting a secure connection with the client application if the client application is determined to be permitted to connect with the server. The processor may be further configured to execute the step of prohibiting the connection with the client application if the client application is determined to not be permitted to connect with the server.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
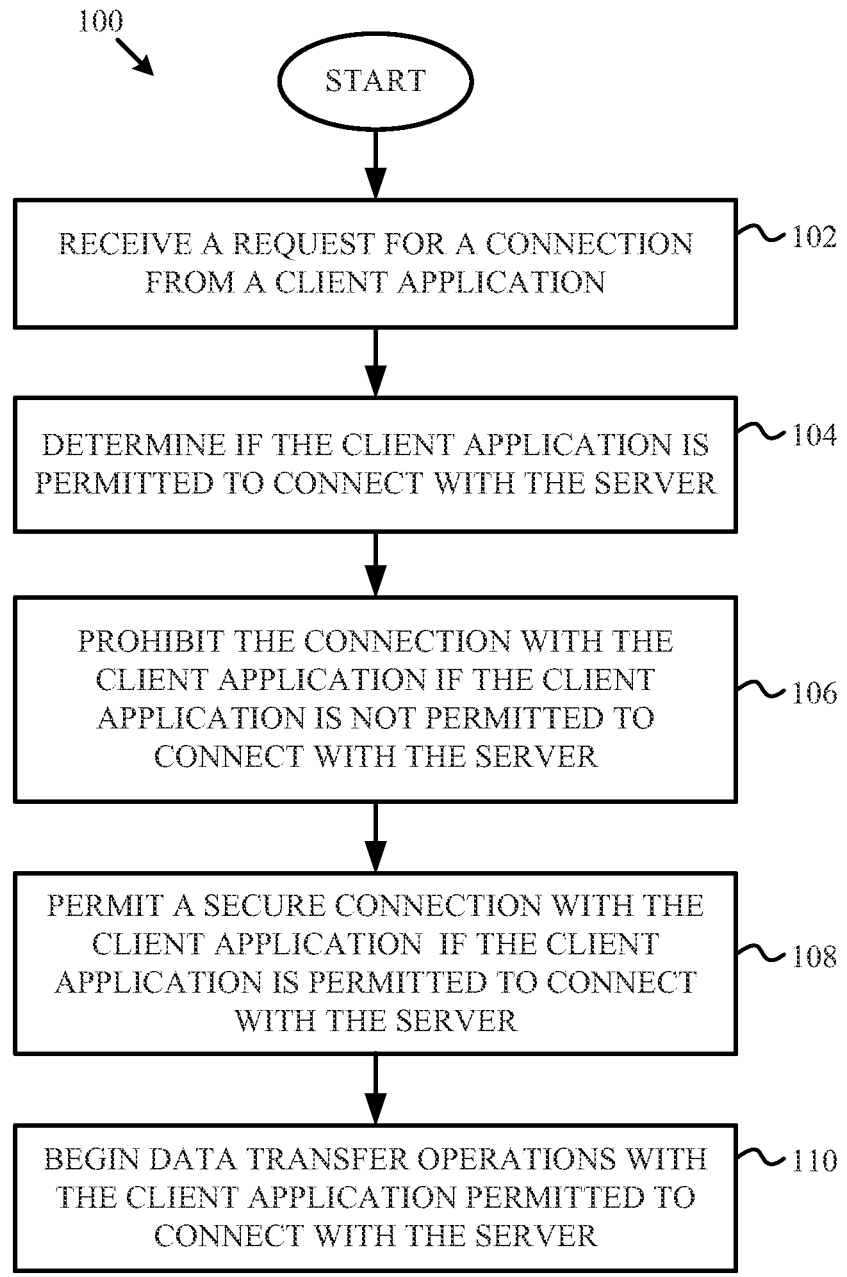
FIG. 1 is a flow chart illustrating a method for securing computer network connections and prohibiting insecure network connections on a server system according to one embodiment of the disclosure.

FIG. 1 is a flow chart illustrating a method for securing computer network connections and prohibiting insecure network connections on a server system according to one embodiment of the disclosure. A method 100 begins at block 102 with receiving, by a server, a request for a connection from a client application. The requested connection of block 102 may be an insecure connection or a secure connection. In one embodiment, the requested connection may include a transport protocol process connection, such as the TP0 process connection of the Open Systems Interconnection (OSI) model.

At block 104, the server may determine if the client application is permitted to connect with the server. In order to determine if the client application is permitted to connect with the server, the server may create a certificate and send the created certificate to a client or a plurality of clients. The server may subsequently request that a client application requesting a connection with the server for data transfer purposes provide the certificate. Upon receipt of the certificate from the client application, the server may process the certificate to validate or invalidate the client application.

The server may, at block 106, prohibit the connection with the client application if the server determines that the client application is not permitted to connect with the server. Therefore, a client application with an insecure connection that is not allowed to have an insecure connection with the server may be prohibited by the server from performing data transfer operations with the server. According to an embodiment, the server may prohibit an insecure connection by terminating an existing insecure connection or by preventing an insecure connection from being established.

At block 108, the server may permit a secure connection with the client application if the server determines that the client application is permitted to connect with the server. In order to establish a connection, the server may determine if connection security protocol settings are specified by a process on the server or if connection security protocol settings are specified on a server system-wide basis. According to an embodiment, the connection security protocol may include the SSL/TLS protocol. In one embodiment, the secure connection of block 108 may be established with the security protocol settings specified by the process on the server. For example, a TP0 process may specify the SSL/TLS settings to be applied. In another embodiment, the secure connection of block 108 may be established with the security protocol settings specified on a server system-wide basis. For example, the same SSL/TLS settings may be applied to multiple TP0 processes that do not specify SSL/TLS settings. According to some embodiments, an SSL/TLS handshake process between the client application and the server may indicate the connection security protocol settings used to establish a permitted secure connection, such as the permitted secure connection of block 108. For example, if a particular process specifies security protocol settings, then the server may establish the secure connection with the client application using the security protocol settings specified by the process. On the other hand, if the process does not specify security protocol settings, then the server may establish the secure connection with the client application using any existing shared security protocol setting specified on a server system-wide basis. By allowing application process to indicate what security protocol settings should be used to establish a secure connection, the indication may be provided on a process individual basis. As a result, different security protocol settings may be used to establish secure connections between the server and different client applications. In other embodiments, however, the server may apply the same security protocol settings to a plurality of client applications.

The server may, at block 110, begin data transfer operations with the client application. In one embodiment, the server may transfer data to the client application through the permitted secure connection established at block 108. In another embodiment, the server may transfer data to the client application through a permitted insecure connection. For example, if the server determines that the client application is permitted to connect with the server and that the client application is allowed to have an insecure connection with the server, then the server may permit an insecure connection with the client application through which data may be transferred.

Figure 2:
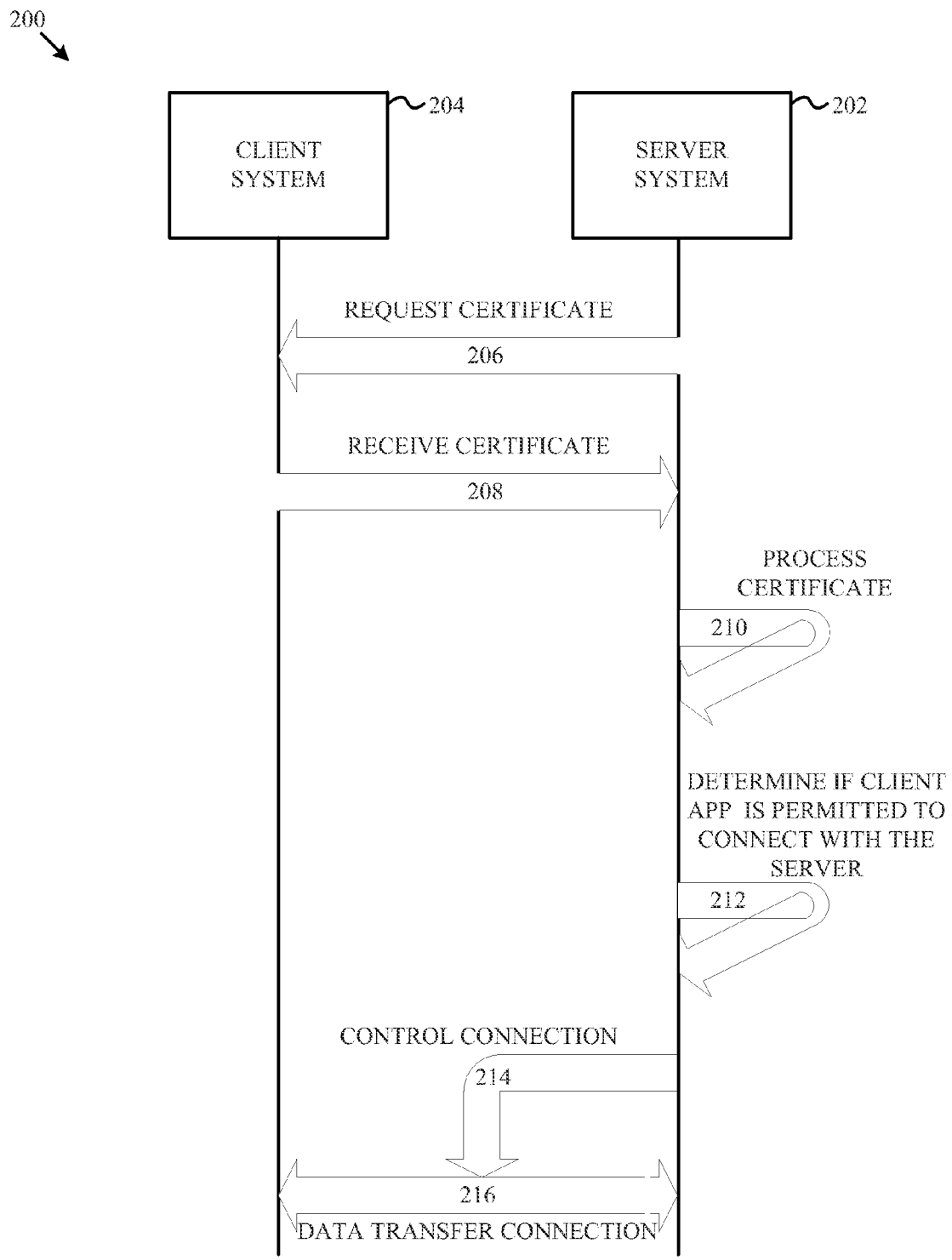
FIG. 2 is a call diagram illustrating actions to secure a computer network connection according to one embodiment of the disclosure.

FIG. 2 is a call diagram illustrating actions to secure a computer network connection according to one embodiment of the disclosure. A server system 202 may communicate with a client system 204. At call 206, the server system 202 may request a certificate from the client system 204, and at call 208, the server system 202 may receive the certificate from the client system 204. At call 210, the server system 202 processes the certificate to determine if a client application of the client system 204 is permitted to connect with the server system 202. At call 212, the server system 202 may determine if a client application from the client system 204 is permitted to connect with the server. At call 214, the server system 202 may control the data transfer connection 216 between the client system 204 and the server system 202. For example, the server system 202 may, at call 214, permit a secure data transfer connection 216 to be established with the client application from the client system 204 using the security protocol settings specified by a process on the server. In another embodiment, the server system may, at call 214, permit a secure data transfer connection 216 to be established with the client application from the client system 204 using existing shared protocol settings specified on a server system-wide basis when a process on the server does not specify security protocol settings. In yet another embodiment, the data transfer connection 216 may be prohibited from being established with the client application, either securely or unsecured, if the server system 202 determines that the client application of the client system 204 is not permitted to connect with the server system 202. According to another embodiment, the server system 202 may permit an insecure data transfer connection 216 to be established with a client application of the client system 204 if the server system 202 determines that the client application is permitted to connect with the server system 202 and that the client application is allowed to have an insecure data transfer connection 216 with the server system 202.

Figure 3:
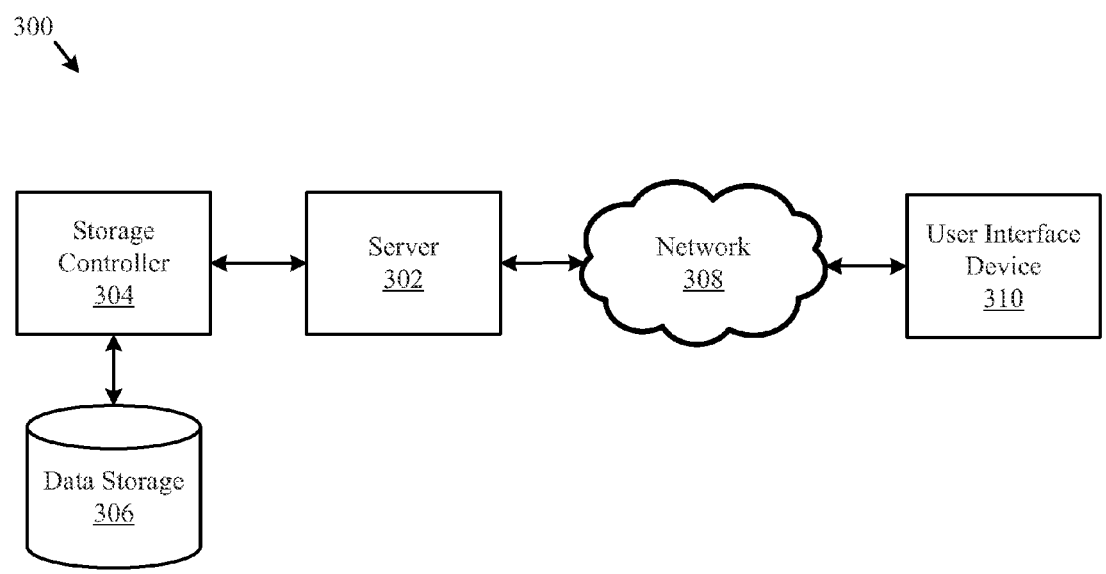
FIG. 3 is a block diagram illustrating a computer network according to one embodiment of the disclosure.

FIG. 3 illustrates one embodiment of a system 300 for an information system, including a system for prohibiting insecure connections. The system 300 may include a server 302, a data storage device 306, a network 308, and a user interface device 310. The server 302 may also be a hypervisor-based system executing one or more guest partitions hosting operating systems with modules having server configuration information. In a further embodiment, the system 300 may include a storage controller 304, or a storage server configured to manage data communications between the data storage device 306 and the server 302 or other components in communication with the network 308. In an alternative embodiment, the storage controller 304 may be coupled to the network 308.

In one embodiment, the user interface device 310 is referred to broadly and is intended to encompass a suitable processor-based device such as a desktop computer, a laptop computer, a personal digital assistant (PDA) or tablet computer, a smartphone or other mobile communication device having access to the network 308. When the device 310 is a mobile device, sensors (not shown), such as a camera or accelerometer, may be embedded in the device 310. When the device 310 is a desktop computer the sensors may be embedded in an attachment (not shown) to the device 310. In a further embodiment, the user interface device 310 may access the Internet or other wide area or local area network to access a web application or web service hosted by the server 302 and may provide a user interface for enabling a user to enter or receive information.

The network 308 may facilitate communications of data between the server 302 and the user interface device 310. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 4:
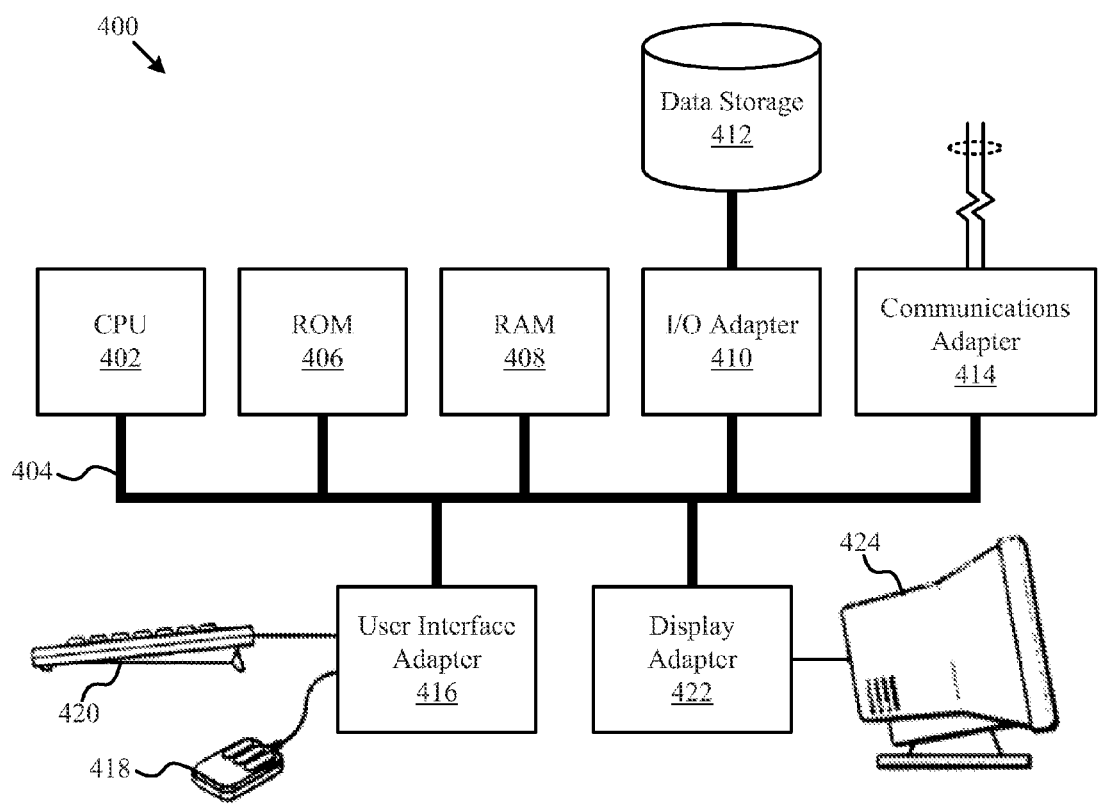
FIG. 4 is a block diagram illustrating a computer system according to one embodiment of the disclosure.

FIG. 4 illustrates a computer system 400 adapted according to certain embodiments of the server 302 and/or the user interface device 310. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computer system 400 also may include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to the network 308, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing device that may be adapted to perform the functions of the server 302 and/or the user interface device 310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 400 may be virtualized for access by multiple users and/or applications.

Figure 5A:
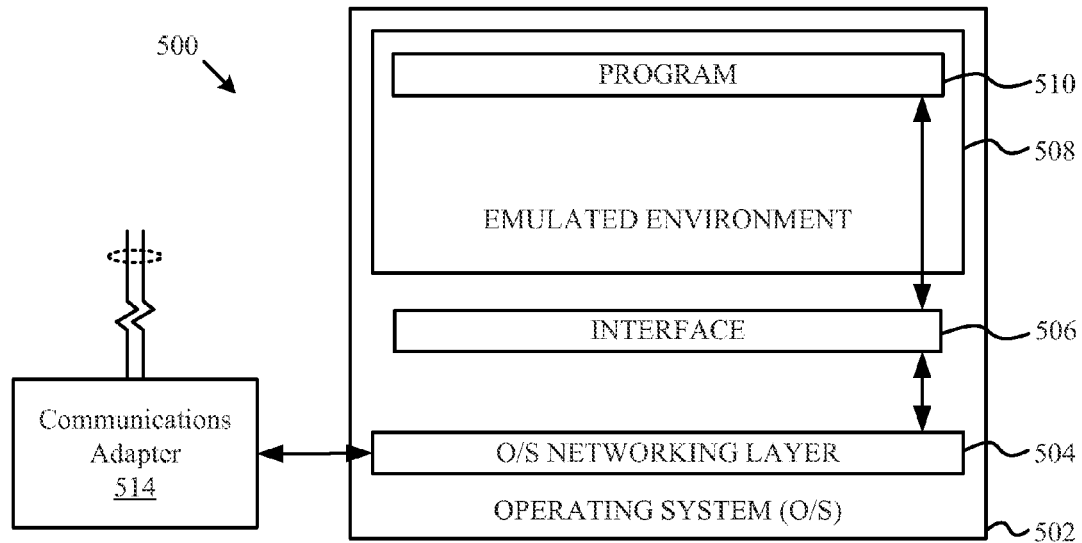
FIG. 5A is a block diagram illustrating a server hosting an emulated software environment for virtualization according to one embodiment of the disclosure.

FIG. 5A is a block diagram illustrating a server hosting an emulated software environment for virtualization according to one embodiment of the disclosure. An operating system 502 executing on a server includes drivers for accessing hardware components, such as a networking layer 504 for accessing the communications adapter 514. The operating system 502 may be, for example, Linux. An emulated environment 508 in the operating system 502 executes a program 510, such as Communications Platform (CPComm) or Communications Platform for Open Systems (CPCommOS). The program 510 accesses the networking layer 504 of the operating system 502 through a non-emulated interface 506, such as extended network input output processor (XNIOP). The non-emulated interface 506 translates requests from the program 510 executing in the emulated environment 508 for the networking layer 504 of the operating system 502.

Figure 5B:
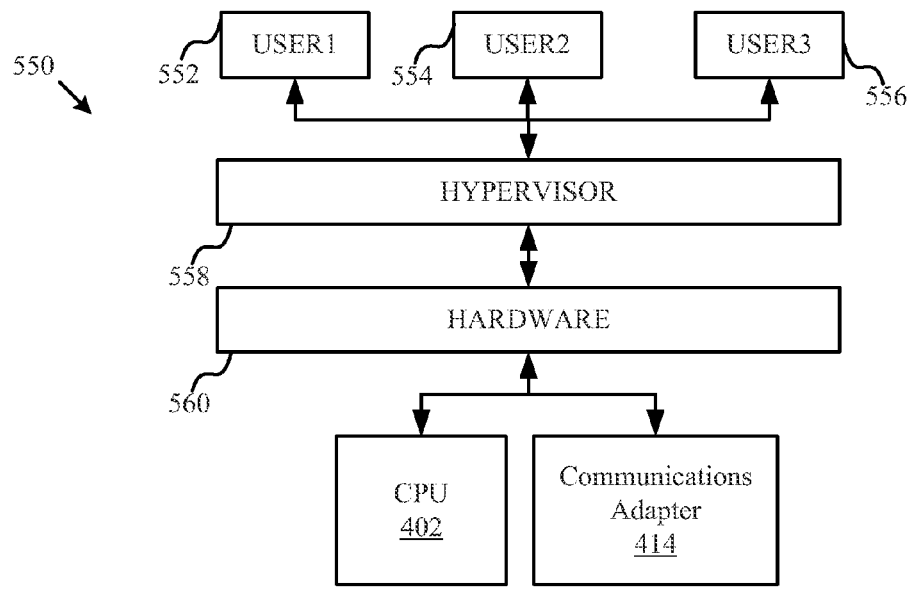
FIG. 5B is a block diagram illustrating a server hosting an emulated hardware environment according to one embodiment of the disclosure.

In another example, hardware in a computer system may be virtualized through a hypervisor. FIG. 5B is a block diagram illustrating a server hosting an emulated hardware environment according to one embodiment of the disclosure. Users 552, 554, 556 may access the hardware 560 through a hypervisor 558. The hypervisor 558 may be integrated with the hardware 560 to provide virtualization of the hardware 560 without an operating system, such as in the configuration illustrated in FIG. 5A. The hypervisor 558 may provide access to the hardware 560, including the CPU 402 and the communications adaptor 414.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
  receiving, by a server, a request for a connection from a client application, wherein the server hosts a plurality of processes;
  determining, by the server, whether to prohibit or permit the connection with the client application based on whether or not the client application can use a secure connection;
  determining, by the server, if connection security protocol settings are specified by one process on the server or if connection security protocol settings are specified on a system-wide basis on the server;
  prohibiting, by the server, the connection with the client application if the server determines that the client application cannot use a secure connection; and
  permitting, by the server, a secure connection with the client application if the server determines that the client application can use a secure connection, wherein the permitted secure connection is established with one of:
    the one process on the server, if the connection security protocol settings are specified by the one process on the server; and
    the server on the system-wide basis, if the connection security protocol settings are specified on the system-wide basis of the server.

2. The method of claim 1, further comprising:
  permitting, by the server, an insecure connection with the client application if the server determines that the client application is permitted to connect with the server and that the client application is allowed to have an insecure connection with the server.

3. The method of claim 2, further comprising transferring data to the client application through one of:
  the permitted secure connection; and
  the permitted insecure connection.

4. The method of claim 2, in which the connection security protocol comprises a secure socket layer/transport layer security (SSL/TLS) protocol.

5. The method of claim 2, in which:
  the connection security protocol settings used to establish the secure connection are indicated by an SSL/TLS handshake between the client application and the server, and
  different security protocol settings are used to establish secure connections between the server and different client applications.

6. The method of claim 1, further comprising:
  creating a certificate; and
  sending the certificate to a client.

7. The method of claim 6, in which determining if the client application is permitted to connect with the server comprises:
  requesting the certificate from the client application;
  receiving the certificate from the client application; and
  processing the certificate to validate or invalidate the client application.

8. A computer program product, comprising:
  a non-transitory computer readable medium comprising code to perform the steps of:
    receiving a request for a connection from a client application, wherein the server hosts a plurality of processes;
    determining whether to prohibit or permit the connection with the client application based on whether or not the client application can use a secure connection;
    determining if connection security protocol settings are specified by one process on the server or if connection security protocol settings are specified on a system-wide basis on the server;
    prohibiting the connection with the client application if the client application cannot use a secure connection; and
    permitting a secure connection with the client application if the client application can use a secure connection, wherein the permitted secure connection is established with one of:
      the one process on the server, if the connection security protocol settings are specified by the one process on the server; and
      the server on the system-wide basis, if the connection security protocol settings are specified on the system-wide basis of the server.

9. The computer program product of claim 8, in which the medium further comprises code to perform the steps of:
  permitting an insecure connection with the client application if the server determines that the client application is permitted to connect with the server and that the client application is allowed to have an insecure connection with the server.

10. The computer program product of claim 9, in which the medium further comprises code to perform the step of transferring data to the client application through one of:
  the permitted secure connection; and
  the permitted insecure connection.

11. The computer program product of claim 9, in which the connection security protocol comprises a secure socket layer/transport layer security (SSL/TLS) protocol.

12. The computer program product of claim 9, in which:
  the connection security protocol settings used to establish the secure connection are indicated by an SSL/TLS handshake between the client application and the server, and
  different security protocol settings are used to establish secure connections between the server and different client applications.

13. The computer program product of claim 8, in which the medium further comprises code to perform the steps of:
  creating a certificate; and
  sending the certificate to a client.

14. The computer program product of claim 13, in which determining if the client application is permitted to connect with the server comprises:
  requesting the certificate from the client application;
  receiving the certificate from the client application; and processing the certificate to validate or invalidate the client application.

15. An apparatus, comprising:
a memory; and
a processor coupled to the memory, the processor configured to execute the steps of:
  receiving a request for a connection from a client application, wherein the server hosts a plurality of processes;
  determining whether to prohibit or permit the connection with the client application based on whether or not the client application can use a secure connection;
  determining, by the server, if connection security protocol settings are specified by one process on the server or if connection security protocol settings are specified on a system-wide basis on the server;
  prohibiting the connection with the client application if the client application cannot use a secure connection;
  permitting a secure connection with the client application if the client application can use a secure connection, wherein the permitted secure connection is established with one of:
    the one process on the server, if the connection security protocol settings are specified by the one process on the server; and
    the server on the system-wide basis, if the connection security protocol settings are specified on the system-wide basis of the server.

16. The apparatus of claim 15, in which the processor is further configured to perform the steps of:
  permitting an insecure connection with the client application if the server determines that the client application is permitted to connect with the server and that the client application is allowed to have an insecure connection with the server.

17. The apparatus of claim 16, in which the processor is further configured to perform the step of transferring data to the client application through one of:
  the permitted secure connection; and
  the permitted insecure connection.

18. The apparatus of claim 16, in which the connection security protocol comprises a secure socket layer/transport layer security (SSL/TLS) protocol.

19. The apparatus of claim 15, in which:
  the connection security protocol settings used to establish the secure connection are indicated by an SSL/TLS handshake between the client application and the server; and
  different security protocol settings are used to establish secure connections between the server and different client applications.

20. The apparatus of claim 15, in which the processor is further configured to perform the steps of:
  creating a certificate; and
  sending the certificate to a client.

21. The apparatus of claim 20, in which determining if the client application is permitted to connect with the server comprises:
  requesting the certificate from the client application;
  receiving the certificate from the client application; and
  processing the certificate to validate or invalidate the client application.

* * * * *